L. HAYES.
RESILIENT WHEEL.
APPLICATION FILED MAR. 1, 1922.
1,433,505.
Patented Oct. 24, 1922.
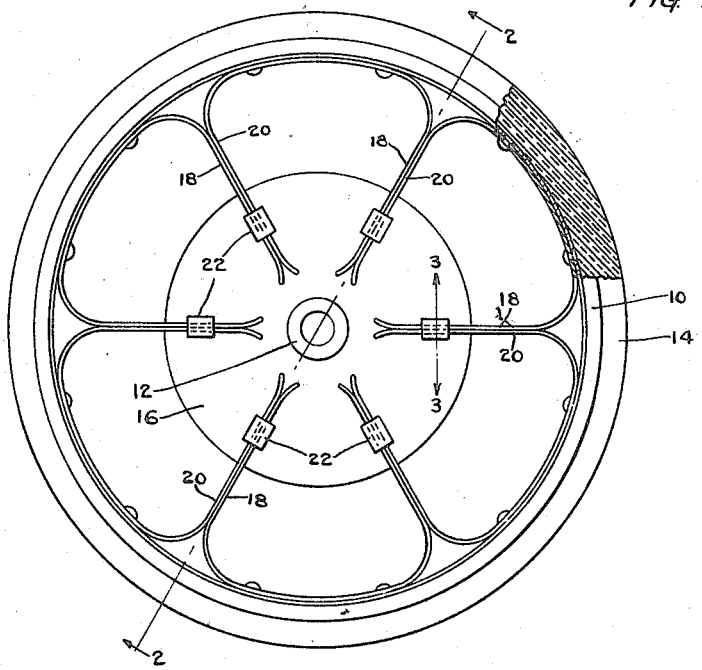
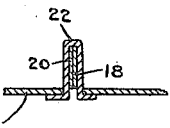
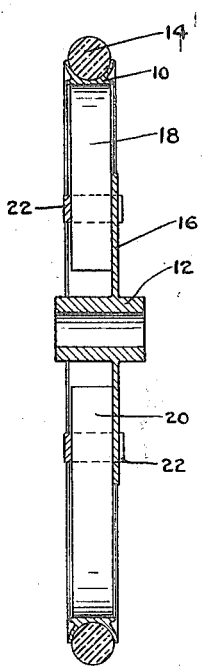
INVENTOR:
LEONARD HAYES.
By Whiteley and Ruckman
ATTORNEYS.

Patented Oct. 24, 1922.

1,433,505

UNITED STATES PATENT OFFICE.

LEONARD HAYES, OF GARRISON, IOWA.

RESILIENT WHEEL.

Application filed March 1 1922. Serial No. 540,137.

*To all whom it may concern:*

Be it known that I, LEONARD HAYES, a citizen of the United States, residing at Garrison, in the county of Benton and State of Iowa, have invented certain new and useful Improvements in Resilient Wheels, of which the following is a specification.

My invention relates to resilient wheels, and an object is to provide a wheel of such construction as to give a sufficient resilient support to vehicles without the necessity of employing pneumatic tires. Another object is to provide a wheel of this character which will be comparatively simple and inexpensive to manufacture and, at the same time, reliable and efficient in use.

The full objects and advantages of my invention will appear in connection with the detailed description, and the novel features embodied in my inventive idea will be particularly pointed out in the claims.

In the accompanying drawings, Fig. 1 is a side elevational view of my wheel. Fig. 2 is a view in section on the line 2—2 of Fig. 1. Fig. 3 is a view in section on line 3—3 of Fig. 1.

In constructing a wheel in accordance with my invention, I provide a rim 10 and a hub 12. The rim is provided with a circumferential groove for receiving a solid tire 14 preferably of rubber. The hub is provided with an encircling flange 16 which is in the form of an annular disk. A plurality of pairs of resilient metal strips 18 and 20 are secured at regular intervals to the inner surface of the rim in suitable manner as by riveting thereto. These pairs of strips constitute the spokes of the wheel and the outer ends of each pair at their places of attachment are considerably separated from each other and are curved inwardly toward each other so as to finally meet and then extend inwardly in radial direction with the radially directed portions positioned flatwise upon each other. The disk 16 is provided with U-shaped retaining members 22 between the arms of which the pairs of strips extend slidably. The inner ends of the strips terminate short of the hub 12 and are preferably bent away from each other as shown in Fig. 1.

The operation and advantages of my invention will be readily understood in connection with the foregoing description. Relative movement of the rim and hub in any direction in opposition to the resilient spokes is permitted so that the spokes cushion shocks imparted to the rim when traveling over rough surfaces and prevent shocks being transmitted to the vehicle. The spokes are so arranged and function in such manner that whatever the relative displacement of the hub and rim the yielding resistance of the spokes is the same upon diametrically opposite sides throughout the circumference of the wheel. The manner in which the rim and hub are connected by resilient spokes is such that the hub is normally maintained centrally within the circumference of the rim and when the rim is subjected to shocks caused by uneven surfaces, relative movement of the rim and hub occurs on account of the fact that the spokes may have a radial sliding movement in either direction with relation to the U-shaped retainers 22 and a flexing movement in either direction with relation to their normal diametral position.

I claim:

1. A resilient wheel comprising a hub, a rim, a plurality of pairs of resilient strips which constitute spokes and extend inwardly from said rim, and a plurality of U-shaped retaining members carried by said hub at regular intervals around the same, each of said retaining members slidably receiving a pair of said strips.

2. A resilient wheel comprising a hub, a rim, a plurality of pairs of resilient strips which constitute spokes, each of said pairs of strips being secured to said rim at spaced positions and then bent inwardly toward each other so as to form radially directed portions positioned flatwise upon each other, an encircling flange carried by said hub, and a plurality of U-shaped retaining members secured to said flange at regular intervals around the same, each of said retaining members slidably receiving a pair of said strips.

In testimony whereof I hereunto affix my signature.

LEONARD HAYES.